United States Patent Office 3,425,289
Patented Feb. 4, 1969

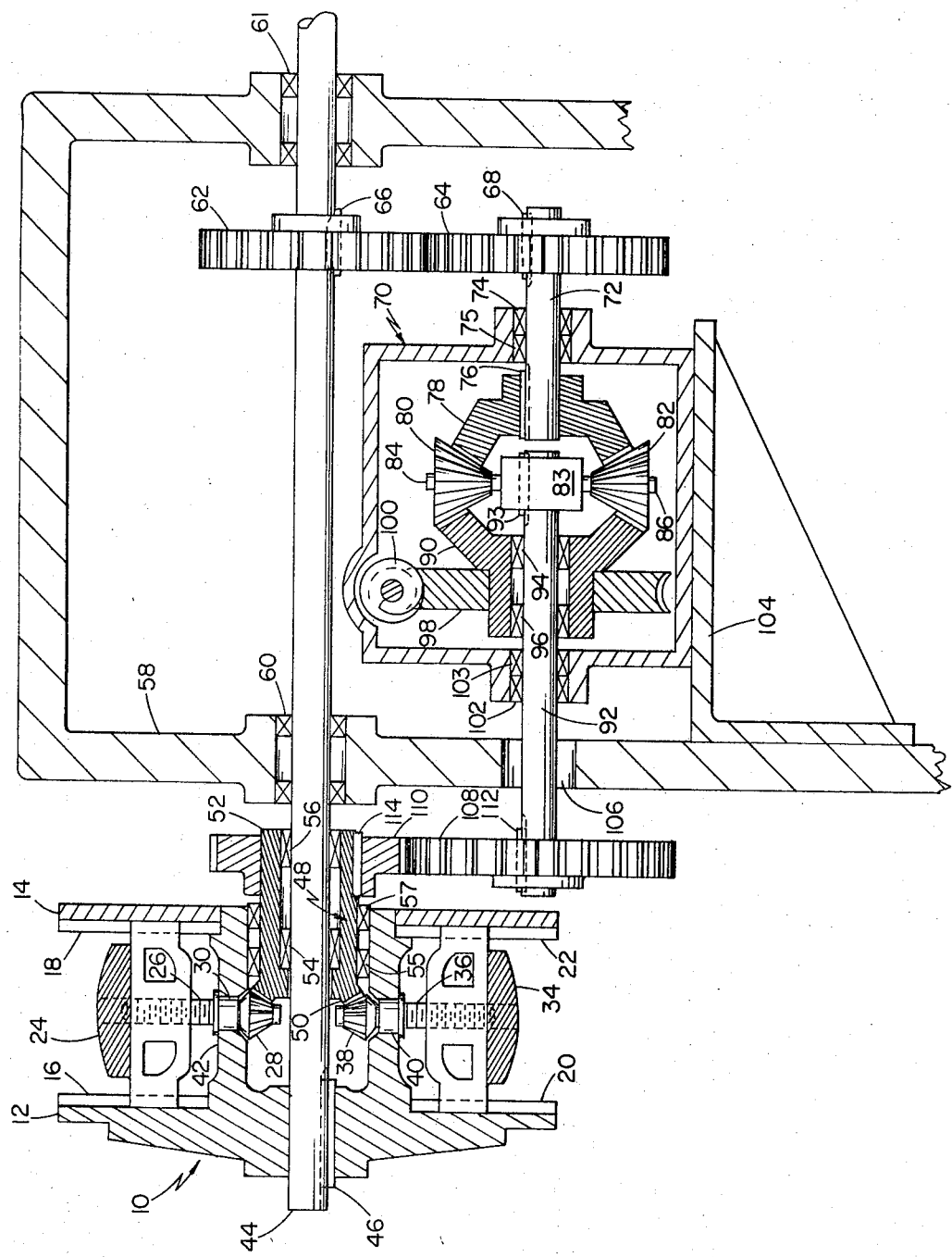

3,425,289
ADJUSTABLE PULLEY
Robert Randall Henry, Andover, Mass., assignor to Hamblet Machine Co., Lawrence, Mass., a corporation of Massachusetts
Filed Aug. 28, 1967, Ser. No. 663,637
U.S. Cl. 74—230.19
Int. Cl. F16h 55/56
10 Claims

ABSTRACT OF THE DISCLOSURE

An adjustable pulley carried on a rotatable pulley shaft and having a coaxial bevel gear adjustment member in combination with a phase shifting differential transmission, having an input shaft drivingly interconnected to said pulley shaft, an output shaft drivingly interconnected to said adjustment member, drive means drivingly interconnecting said input and output shafts, and phase shifting means interconnected with said drive means for changing the phase relationship of said input and output shafts, the drive ratio of said pulley and said adjustment member being 1:1 in a uniform direction.

---

This invention relates to an adjustable pulley system and more particularly to such a pulley in combination with novel means for adjusting the pulley.

A principal object of this invention is to provide an adjustable pulley in combination with means for accomplishing the adjustment which will permit adjustment in both stationary and rotating conditions of the pulley. Another object is to provide, in such a combination, adjustment means which will permit adjustments to be highly accurately controlled and, if desired, indexed. Another object is to provide a system in which the adjustment feature is inherently self-locking when not in actual use. Still the objects are to provide a simple, rugged design and to provide a system utilizing commercially available elements.

In general, the invention features an adjustable pulley, having an adjustment member, in combination with a phase shifting differential transmission, in which the pulley is drivingly interconnected via a shaft to a differential input and the adjustment member is drivingly interconnected to the differential output. Phase shifting means, in the differential, is provided to selectively change the phase relationships of the input and output thereby to selectively actuate the adjustment member for pulley adjustment.

Other objects, features and advantages of the invention will be apparent to those skilled in the art from the following detailed description of a preferred embodiment thereof together with the accompanying drawing, in which:

The disclosed figure is a partly diagrammatic side elevation is section of a pulley and adjustment means therefor in accordance with the invention.

With reference now to the drawing, the pulley 10 includes spaced coaxial flanges 12, 14 having a plurality of, preferably at least eight, pairs of guide rails 16, 18, 20, 22 thereon aligned and radially extending therealong. Segments 24, 34 are slidably mounted on each pair of guide rails 16, 18 and 20, 22 for radial movement to adjust the pulley diameter. Threaded shafts 26, 36 having bevel gears 28, 38 on their adjacent ends, are freely journaled as at 30, 40 in an axially extending hub portion 42 of the pulley and extend therethrough into threaded engagement with the segments 24, 34. An adjustment member, bevel gear 50, coaxial with pulley 10 and having an axially extending portion 52 protruding beyond flange 14 is rotatably supported in the pulley within hub 42 by bearings 55, 57 and engages in driving engagement the bevel gears 28, 38 on each threaded shaft 26, 36 to drive each such shaft to adjust the radial position of the segments 24, 34 and consequently the effective pulley diameter.

Pulley 10 is mounted coaxially on shaft 44 extending therethrough, bevel gear 50 being rotatably supported on the shaft 44 by bearings 54, 56 and the pulley is connected by key 46 to shaft 44 for rotation therewith. The shaft is conventionally mounted by a bearing 60, 61 in a frame 58 and extends therethrough.

Similar adjustable pulleys have been known for many years, one similar such pulley being shown in Everett U.S. Patent No. 664,996, dated Jan. 1, 1901.

For adjusting the pulley 10, a phase shifting differential transmission 70, partly diagrammatically represented in the drawing, is provided. In a preferred embodiment of the invention, the phase shifting differential used is manufactured by Fairchild Hiller, Industrial Products Division, Winston-Salem, N.C., under the trademark "Specon PSD.".

The differential 70 is mounted on a support 104 connected to frame 58. The differential 70 includes an input shaft 72 rotatably supported in bearings 74, 75 and has a bevel gear 78 fixedly connected coaxially to the input shaft 72, as by key 76. The differential 70 also includes an output shaft 92 coaxially aligned with input shaft 72 and rotatably supported in bearings 102, 103. At its end adjacent input shaft 72, output shaft 92 has a support member 83 fixedly mounted thereon as by key 93. Radially extending from support 83 are a pair of support shafts 84, 86 each having a bevel gear 80, 82 rotatably mounted thereon in driving engagement with the bevel gear 78 of input shaft 72. Rotatably supported coaxially on output shaft 92 by bearings 94, 96 is a bevel gear 90, oppositely facing gear 78 and also in driving engagement with gears 80, 82. A worm gear 98, coaxial of shaft 92 is fixedly mounted on gear 90 and drivingly engages worm 100 supported in the differential 70. A handwheel (not shown) is attached to one end of worm 100 for permitting manual adjustment thereof. As input shaft 72 is rotated gear 78 drives gears 80, 82 against gear 90, which is normally held stationary by worm gear 98 and worm 100, thus causing output shaft 92 to rotate in the same direction as input shaft 72 but usually at a differential speed, the ratio of input to output being 2:1 in the illustrated embodiment. To change the phase relationship of the input and output shafts 72, 92, worm 100 is rotated which incrementally, depending on direction of rotation, adds to or subtracts from rotation of output shaft 92.

As shown in the drawing the differential input shaft 72 is connected to shaft 44 by gears 62, 64, attached to the shafts, respectively, by keys 66, 68. Output shaft 92 is connected to gear 50 by gears 108, 110 attached to the shaft and gear, respectively, by keys 112, 114, output shaft extending through an aperture 106 in frame 58 to a position adjacent pulley 10. The gearing is arranged to provide a 1:1 drive ratio between shaft 44 and bevel gear 50. Thus, where, as in the preferred embodiment, there is a 2:1 ratio of input to output of the differential the gear ratios of gears 62, 64 are 1:1 and of gears 108, 110 are 1:2 providing an effective 1:1 ratio of pulley 10 to adjustment member 48.

In operation, as pulley 10 is driven, shaft 44 is rotated driving the differential 70 through gears 62, 64. Differential 70 in turn drives gear 50 through gears 108, 110 and, without more, gear 50 rotates at the same speed as pulley 10, thus causing no change of segment position or of pulley diameter. To change pulley diameter, whether it is stationary or rotating, worm 100 is rotated which changes the input and output shaft 72, 92 phase relationship thus causing relative rotation of pulley 10 and gear 50 which because of the engagement of gear 50 with gears 28, 38 causes rotation of the threaded shafts 26, 36 and hence radial movement of segments 24, 34. Advantageously, a finite number of turns of worm 100 will cause a finite adjustment of segments 24, 34, thus permitting highly accurate control of adjustment and, indeed, indexing thereof if desired. Also, advantageously, the phase shifting feature of the differential is inherently self-locking when not in use, thus elimination the necessity for a locking system in the pulley.

What is claimed is:

1. An adjustable pulley system comprising, in combination:
   an adjustable pulley, rotatably mounted, having an adjustment member rotatably mounted therein for rotation relative thereto for adjustment of said pulley;
   a differential transmission including an input shaft, an output shaft, differential drive means drivingly interconnecting said input and said output shafts in a predetermined drive ratio, and phase shifting means drivingly interconnected with said differential drive means for selectively altering the phase relationship of said input and said output shafts on actuation of said phase shifting means;
   input drive means interconnecting said pulley and said input shaft in a predetermined drive ratio; and
   output drive means interconnecting said adjustment member and said output shaft in a predetermined drive ratios;
   the drive ratio of said pulley to said adjustment member, as determined by said predetermined drive ratios, being 1:1,
   whereby said pulley and said adjustment member normally maintain a 1:1 drive relationship to maintain a predetermined adjustment and whereby on actuation of said phase shifting means the phase relationship of said input and output shafts is changed causing relative rotation of said pulley and said adjustment member for adjustment of said pulley.

2. The pulley system claimed in claim 1 in which said pulley is coaxially and fixedly mounted on a rotatable pulley shaft and in which said input drive means is interconnected between said pulley shaft and said input shaft.

3. The pulley system claimed in claim 2 in which said adjustment member is mounted coaxially in said pulley, rotatably therein and on said shaft, said member having a portion extending beyond said pulley and said output drive means being interconnected between said output shaft and said portion.

4. The pulley system claimed in claim 1 in which said input and output shafts are coaxial, said differential drive means comprises a first gear coaxially fixedly mounted on one of said input and output shafts for rotation therewith, at least one gear fixedly mounted on the other of said input and output shafts for rotation therewith, said one gear mounted on an axis at right angles to the axes of said input and output shafts and said one gear in mesh with said first gear, and a second gear coaxially rotatably mounted on the other of said input and output shafts also in mesh with said one gear, said second gear normally held stationary; and in which said phase shifting means comprises a worm gear fixedly connected to said second gear for rotation therewith, and a worm rotatably mounted in said differential in mesh with said worm gear for normally maintaining said second gear stationary and for incrementally changing the phase relationship of said input and output shafts selectively on on actuation of said worm.

5. The pulley system claimed in claim 4 in which said pulley is coaxially and fixedly mounted on a rotatable pulley shaft and in which said input drive means is interconnected between said pulley shaft and said input shaft.

6. The pulley system claimed in claim 5 in which said adjustment member is mounted coaxially in said pulley, rotatably therein and on said shaft, said member having a portion extending beyond said pulley and said output drive means being interconnected between said output shaft and said portion.

7. The pulley system claimed in claim 6 in which said differential transmission comprises a unit positioned to one side of and spaced from said pulley shaft.

8. The pulley system claimed in claim 7 in which said input and output drive means are gear sets.

9. In an adjustable pulley system, including a rotatably mounted adjustable pulley having an adjustment member coaxially positioned and rotatably mounted relative to said pulley for adjustment of said pulley on change of phase relationship of said pulley and said adjustable member, and means for normally maintaining said phase relationship and for selectively changing said phase relationship, that improvement in which said means comprises:
   a diffferential transmission having an input shaft, an output shaft, said input and output shafts connected one respectively to each of said pulley and said adjustment member, differential drive means interconnected between said input and output shafts and phase shifting means drivingly interconnected with said drive means for selectively altering the phase relationship of said input and output shafts;
   whereby actuation of said phase shifting means to alter the phase relationship of said input and output shafts alters the phase relationship of said pulley and said adjustment member.

10. The pulley system claimed in claim 9 in which said input and output shafts are coaxial, said differential drive means comprises a first gear coaxially fixedly mounted on one of said input and output shafts for rotation therewith, at least one gear fixedly mounted on the other of said input and output shafts for rotation therewith, said one gear mounted on an axis at right angles to the axes of said input and output shafts and said one gear in mesh with said first gear, and a second gear coaxially rotatably mounted on the other of said input and output shafts also in mesh with said one gear, said second gear normally held stationary; and in which said phase shifting means comprises a worm gear fixedly connected to said second gear for rotation therewith, and a worm rotatably mounted in said differential in mesh with said worm gear for normally maintaining said second gear stationary and for incrementally changing the phase relationship of said input and output shafts selectively on actuation of said worm.

References Cited

UNITED STATES PATENTS

| | | | |
|---|---|---|---|
| 818,280 | 4/1906 | Noel | 74—230.19 |
| 3,150,529 | 9/1964 | Walk | 74—230.19 |

FRED C. MATTERN, JR., *Primary Examiner.*

JAMES A. WONG, *Assistant Examiner.*

U.S. Cl. X.R.

74—710.5